Feb. 11, 1941.   R. L. STEVENS ET AL   2,231,035
POWER ABSORPTION METERING SYSTEM
Filed Feb. 10, 1937   4 Sheets-Sheet 1
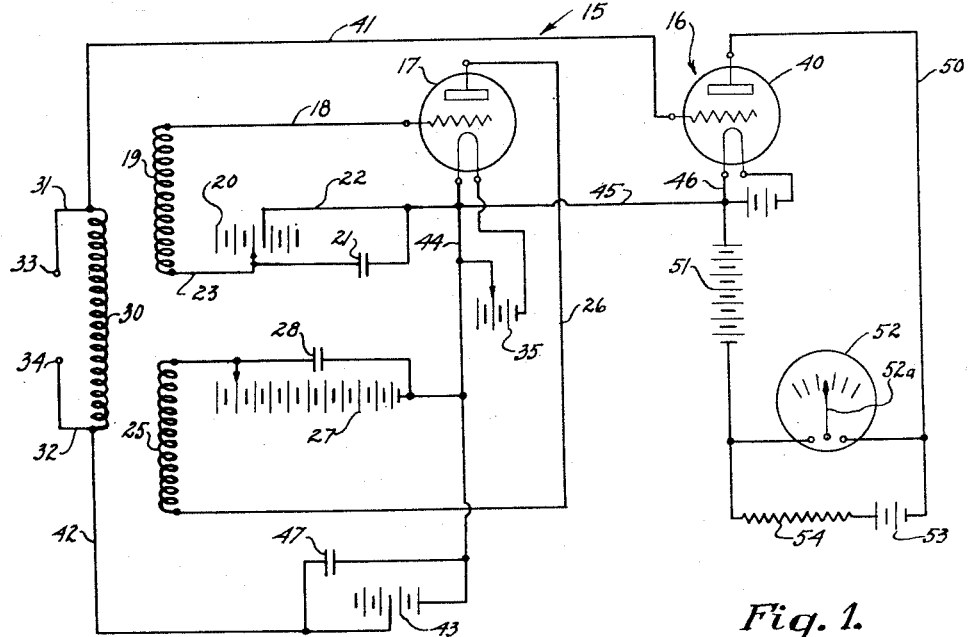
Fig. 1.
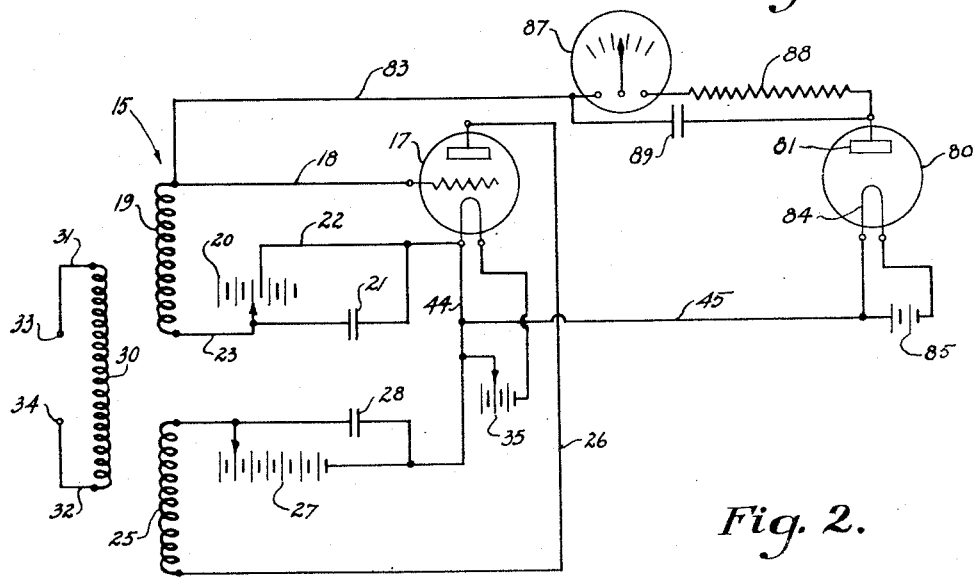
Fig. 2.
Fig. 1a.
Inventor.
Robert L. Stevens.
James P. Dallas.
Attorney.

Inventor.
Robert L. Stevens.
James P. Dallas.

Attorney.

Inventor.
Robert L. Stevens
James P. Dallas.
Attorney.

Inventor.
Robert L. Stevens.
James P. Dallas.
Attorney.

Patented Feb. 11, 1941

2,231,035

UNITED STATES PATENT OFFICE 2,231,035

POWER ABSORPTION METERING SYSTEM

Robert L. Stevens and James P. Dallas, Seattle, Wash., assignors of one-half to Dillon Stevens and one-half to M. B. Pendleton, both of Los Angeles, Calif.

Application February 10, 1937, Serial No. 125,110

34 Claims. (Cl. 175—183)

This invention relates generally to methods of and means for measuring and/or controlling properties related to dielectric losses and other electrical and physical characteristics and relationships of materials. A typical application of the invention is the measurement of moisture content of materials, and the invention will largely be explained in that connection, though without implied limitation to such use.

A measurement and control system of the type contemplated by this invention has a large number of practical applications, and among the objects of the invention may be mentioned the provision of a method of and means for accurately measuring and/or controlling the moisture content (either total moisture in a sample or percentage of moisture) of such materials as wood, paper, photographic film, or food products; air humidity; the electrical properties of materials, such as dielectric losses, power factor, or electrical resistance; the proportion of ingredients in mixtures or compounds, as in prepared clays or plastic materials; or the physical dimensions of materials, as the thickness of paper.

A further object of the invention is to provide an instrument and system for accomplishing the above that is adaptable to direct calibration of an indicating meter, as in percentage of moisture, or to the indication and control of continuous processes.

A still further object of the invention is to provide an instrument and system of the character mentioned which is easily and conveniently adjustable to maintain its calibration, such adjustment compensating all such variable factors as variations in battery voltage, tube aging, etc.

As stated above, a typical and particular application of the invention is the measurement of moisture content of materials, and a still more specific and illustrative application is the measurement of moisture content of lumber. Methods now known for making such measurements may be classified in two groups: first, dielectric constant or frequency change methods, and second, power loss, dielectric loss or power factor measurement methods. Methods of the first group depend upon the known fact that when a piece of material such as wood is brought into a high frequency electrostatic field, as between the plates of a test condenser, the dielectric constant of the medium in which the field exists is changed, and the degree of change depends upon such factors as temperature, wood structure, resins and other variables, and moisture. If all factors but moisture are held constant or compensated for, it is evident that a system arranged to measure the change of capacitance of the test condenser, or the accompanying change in frequency of oscillation of an oscillator circuit associated with the test condenser, as different samples of wood are placed in the field of the condenser, will indicate the degree of moisture present. The effects of the factors other than moisture on the dielectric constant cannot in practice ordinarily be held sufficiently constant, however, to permit satisfactory results. Furthermore, with moisture contents below 15%, the effects on the dielectric constant produced by small variations in wood structure and resins are very great as compared to the variations produced by moisture, so that apparatus of extreme sensitivity is required, and the inevitable error is very large.

Methods of the second group depend upon the electric power absorbed or lost when a piece of material such as wood is placed in an oscillating field, preferably of high frequency, or in any power absorbing relation to an alternating or oscillating electrical current, rather than upon any measurable change in current flow or frequency caused by variations in the capacity of the test condenser. In fact, methods of this second group purposely avoid, as much as possible, the effects of capacity or frequency change, as explained in Patent No. 1,976,904 to Terman, in which is disclosed one "power-loss" type of measurement system. The power lost when a material such as wood is placed in an electrostatic field is known as dielectric loss, and is dissipated in the form of heat in the wood. Power may also be absorbed by placing the material in an electromagnetic or inductive field, or by placing the material in conductive relation in the electrical circuit. The absorption by the material on test may be measured as power lost, or a measurement of the accompanying shift of power factor may be taken as indicative of the power absorbed.

The high frequency power losses of a material such as wood are also affected by a number of factors in addition to moisture content, including temperature, frequency, field concentration, structure of wood, resins, soluble extractives, etc. However, in the range of from 5 to 25% moisture, the moisture factor is by a large margin the greatest factor in determining the high frequency power absorption losses of most materials, including wood. Moreover, the factors other than moisture representing variable power absorbing qualities of wood itself tend to compensate one another. The remaining factors, i. e., temperature, frequency and field concentration, can be grouped as an easily determined constant for a given material, which may be called the dry loss factor. Thus the original eight or more factors are reduced to two, moisture content and dry losses, and we have $$M = \frac{P}{D}$$

where P is the total power absorbed, M is the moisture content, and D is the dry loss constant.

The system provided by the instant invention is of the last mentioned class, depending upon a measurement of electrical power absorbed by a material under test. In accordance with the preferred form of the present invention, there is produced a flow of high frequency alternating or oscillating electrical current of voltage which decreases with increase in load or power absorbed, and the material to be tested is placed in power absorbing relation to this electrical current, as by being placed in an electrostatic or an electromagnetic field produced by said current, or by being placed conductively in a circuit carrying said current. The oscillating current is furnished, in the preferred form of the invention, from a vacuum tube oscillator, which is so designed that its voltage (the high frequency voltage across its oscillating circuit, or across the "load") falls off materially with increase in power load. Such a characteristic of a generator is ordinarily defined as "poor regulation," though for the instant purpose we may refer to the oscillator as having high voltage-sensitivity to load. It is of course well known that a vacuum tube oscillator is for all ordinary purposes designed with the opposite purpose in view, i. e., to maintain a constant voltage with varying load. The oscillator here utilized is therefore unique in that it is specifically designed to have what is ordinarily called poor regulation, or as here defined, high voltage-sensitivity to load. The vacuum tube oscillator or high frequency generator thus furnishes an alternating current of voltage sensitive to load. The material to be tested is placed, as stated, in power absorbing relation to that current, and thus constitutes a variable load. The variation in voltage accompanying variations in power absorption with different samples of material, e. g., woods of different moisture content, is then taken to indicate the factor being tested, here moisture content. This is accomplished, typically and preferably, by measuring the value of a current flow that is proportioned to or varies in accordance with the falling oscillator voltage, as for instance by utilizing the vacuum tube voltmeter principle. For this purpose, we may either employ a conventional vacuum tube voltmeter, or, as is much simpler, and therefore to be preferred, we may measure or employ a current flow in the oscillator circuit that falls substantially with the increase in the output voltage of the oscillator. If the application is one of control rather than measurement, or along with measurement, such voltage representing current flow is utilized, for example, through any conventional relay system, to effect the control required.

The condition for sustained oscillation at a given amplitude in any vacuum tube oscillator is that amplified energy be delivered from the output (plate) circuit back to the input (grid) circuit in proper phase and in sufficient amount to overcome the losses within the grid circuit and to supply the necessary potential variations to the grid. The conventional oscillator familiar to those skilled in the art generates oscillations of a given voltage amplitude for a given plate potential, filament potential, grid bias, and load, and moderate and even substantial or heavy increases in load have but slight effect on the amplitude of the voltage oscillations, the tendency of the oscillator being to maintain the voltage across its oscillating circuit constant with increase in load, and the increased load being reflected as an increase in the direct current component of plate current. This increase in plate current has been taken as a measure of the power drain on the oscillator (see United States Patent No. 1,976,904 to Terman), but the proportionate increase in plate current for relatively small or moderate power loss increases is slight and suitable readings are difficult if not impossible. An over-load on a normally powered oscillator simply causes it rather suddenly to stop.

The oscillator employed in accordance with the present invention has modified operating characteristics enabling accurate measurements to be taken of very slight variations in delivered power. This oscillator, as mentioned above, is designed and adjusted, in direct contra-distinction to conventional practice, to have a rapidly falling output voltage characteristic with increase of load. In an illustrative form of the invention, the desired characteristics are achieved by utilizing a source of plate power of lower voltage than normal for the vacuum tube employed, and if the tube employed requires, in order to initiate oscillations at the low plate voltage used, by employing a positive bias on the grid. Various expedients or combinations of potentials may be utilized to establish the rapidly falling or highly sensitive voltage characteristic sought, such as sub-normal voltage for the plate, with either normal or sub-normal cathode voltage, and with either positive, zero, or negative bias on the grid, depending in any given case both upon the particular characteristics of the vacuum tube to be used, and upon the required sensitivity of the system. Such an oscillator, because of its low voltage power supply, operates with barely sufficient energy delivery to its grid circuit to sustain oscillations, while its ability to deliver power to an external load is limited. Small external loads divert energy from the grid circuit, which the low voltage plate circuit power supply cannot replace, and the amplitude of the oscillations accordingly falls in a sensible manner, measurable with a vacuum tube voltmeter. Contrary to the operation of a conventional, normally powered oscillator, the plate current falls measurably with this fall in oscillation amplitude, this being due principally to the low plate voltage, which limits the amount of power available to the oscillator, and produces a tendency for the load to inhibit or attentuate oscillations rather than to draw power from the oscillator and maintain or increase its power input. The inability of the oscillator to maintain or increase its plate current with increasing load may be contributed to or enhanced by subnormal filament or cathode voltage, which limits emission from the cathode, and hence limits plate current, though with certain vacuum tubes this is not necessary. Positive grid bias, when used, as is preferable in the most sensitive form of the apparatus when using certain types of tubes, aids initiation of oscillation at the low plate voltage employed, and also causes large circulating currents in the grid circuit. These grid currents also fall rapidly in consonance with falling oscillation amplitude, and hence with increasing load.

The falling circulating currents in the plate and grid circuits may be taken as measures of the falling voltage output of the oscillator, and therefore, of the power loss or load, and in the preferred form of the invention, a suitable current meter is placed in the circuit where it will respond in accordance with either the plate or the grid current, or both, and will indicate directly the load on the oscillator. These plate and grid circuit circulating currents exhibit substantial decrease in magnitude for relatively slight increases in load, and furnish much more sensitive and accurate readings, especially where small power losses are involved, than are obtainable by measurement of the increase in plate current with increase in load in a conventional oscillator.

With this preliminary discussion in mind, the invention in all of its aspects, including various objects, features and applications not specifically mentioned hereinabove, will now be made apparent from the following detailed description of present specific illustrative forms of the invention, reference for this purpose being had to the accompanying drawings, in which:

Fig. 1 is a diagram showing an illustrative system in accordance with the present invention, the test electrodes not being illustrated;

Fig. 1a shows a typically calibrated measuring instrument scale;

Fig. 2 is a modification of the system of Fig. 1;

Figure 3:
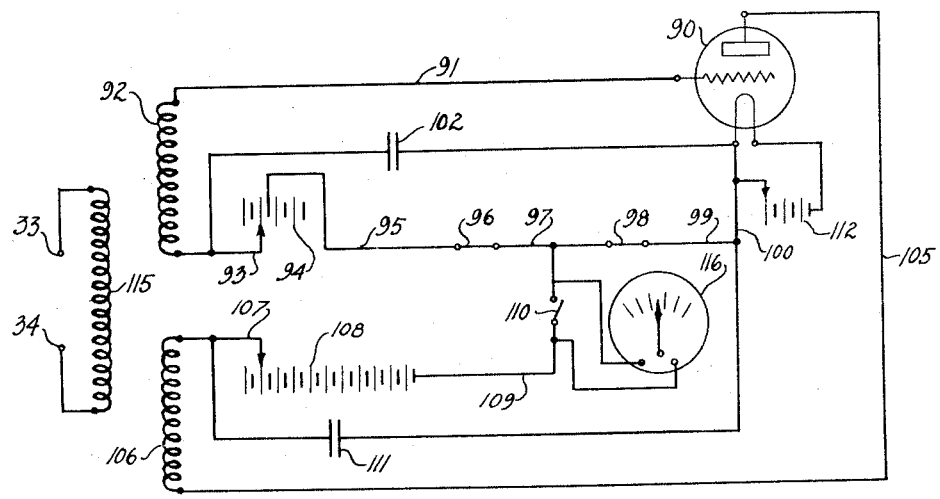
Fig. 3 is a further modification, in which the oscillator and vacuum tube voltmeter sections of the system are combined and employ a single common vacuum tube.
Figure 8:
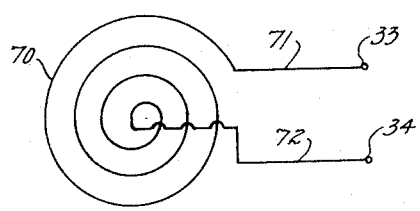
Figure 9:
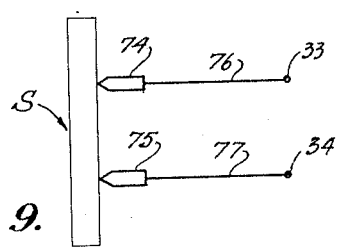
Figure 10:
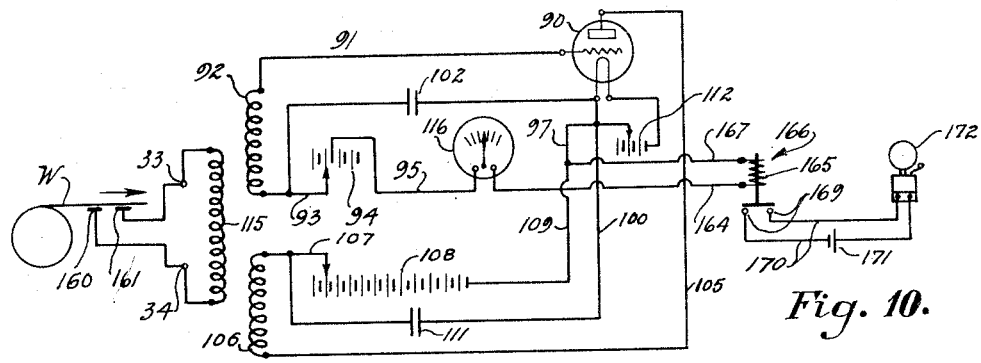
Figure 11:
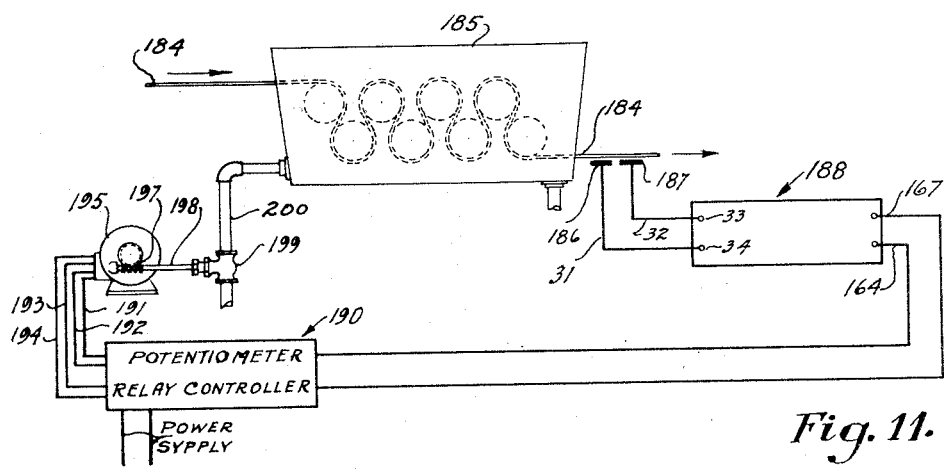
Figure 12:
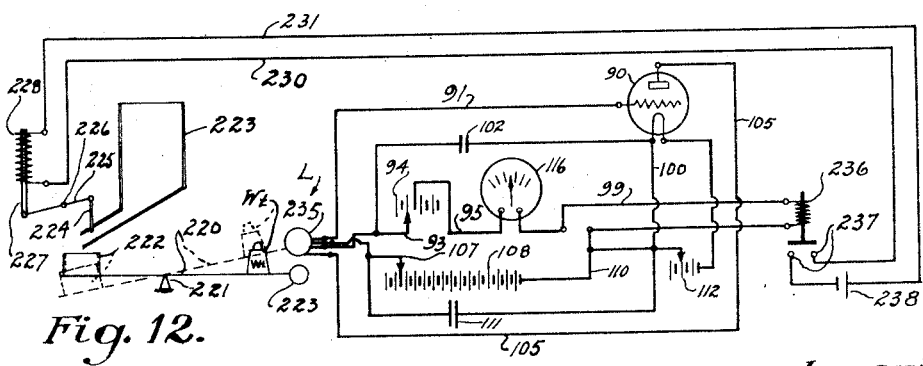

Fig. 8 indicates diagrammatically a test electrode of the induction or electromagnetic field type;

Fig. 9 indicates diagrammatically a pair of electrodes of the conductive type;

Fig. 10 shows a system similar to that of Fig. 3 adapted to the purpose of control as well as measurement;

Fig. 11 shows an automatic moisture control system in accordance with the present invention; and Fig. 12 shows a weighing system in accordance with the present invention.

It is to be understood preliminarily that the instant invention is susceptible to embodiment in numerous circuit forms; those here given are chosen as typical of some of its practical and present preferred forms, though such specific illustrative forms of the invention are not to be taken as limitative on the invention considered in its broader aspects.

In Fig. 1 of the drawings numeral 15 designates generally the high frequency generator in the form of a vacuum tube oscillator, and numeral 16 designates a vacuum tube voltmeter.

The vacuum tube 17 of the oscillator has a grid-filament circuit 18 composed of inductance 19, adjustable grid battery 20 and by-pass condenser 21 shunting battery 20. The filament lead 22 of circuit 18 is connected to an intermediate tap of battery 20, which is indicated as made up of a plurality of cells, while circuit lead 23 between inductance 19 and the battery may be connected to the battery on either side of the connection point of lead 22. Thus, by such adjustment the grid of tube 17 may be made either negative or positive with reference to the filament, depending upon the particular characteristics of the tube in use.

Coupled to inductance 19 is an inductance 25 which is included in the plate-filament circuit 26 of vacuum tube 17, said circuit including adjustable plate voltage source 27 which is by-passed by condenser 28.

Coupled to inductances 19 and 25 is an inductance 30, to the ends of which are connected leads 31 and 32 going to electrode terminals 33 and 34, respectively.

Vacuum tube oscillator 15 is designed to have what is ordinarily termed "poor regulation," or as here defined, high sensitivity of voltage to load, the load being understood to be, in the instance of Fig. 1, that drawn from terminals 33, 34. This may be accomplished in various ways, typical of which is adjustment of the power sources of the oscillator below normal values. Thus, typically, either plate circuit voltage source 27, or filament current source 35, or both, may be adjusted in voltage to values sufficiently below normal that the output voltage of the oscillator will be highly sensitive to changes of load.

Vacuum tube voltmeter 16 is connected and arranged to measure this voltage change with variation in load. As arranged in Fig. 1, the grid element of the vacuum tube 40 of vacuum tube voltmeter 16 is connected by lead 41 to one end of inductance 30, the other end of which is connected by lead 42 through grid bias voltage source 43 to the filament lead 44 of vacuum tube 17, the latter being in turn connected by lead 45 to the corresponding filament lead 46 of vacuum tube 40. Grid bias battery 43, which is adjustable in voltage, as indicated, is by-passed by condenser 47.

The plate circuit 50 of vacuum tube 40 includes plate voltage source 51 and a suitable current indicating means, which may be a standard milliammeter, the latter being shunted by a balancing voltage source 53 and voltage limiting resistor 54. Voltage source 53 and resistor 54 constitute a means for supplying a current of opposite polarity to that flowing through meter 52 from plate circuit 50 for the purpose of balancing out static currents flowing in said circuit.

It will be evident that the oscillator voltage across inductance 30, which is included in the grid circuit of voltmeter tube 40, governs the amplitude of the plate current in plate circuit 50 of said tube, and that milliammeter 52 which reads that plate current may accordingly be calibrated in terms of the oscillator voltage across inductance 30, or in terms of any factor or function that varies with said voltage. It will also be evident that while the vacuum tube voltmeter is shown as connected across the output inductance of the oscillator, the voltmeter may be connected across any part of the oscillator circuit where high frequency voltages appear and are subject to regulation in accordance with the load applied across terminals 33, 34.

In the interest of simplicity, separate voltage and current sources are shown for each function of the circuit. Such sources may of course, by methods of common practice, be combined and all the operating power derived from one or more sources, which may be either batteries or a power line supply source. Such practice is common in all high frequency vacuum tube systems, and will be understood by those skilled in the art without further description.

Figure 6:
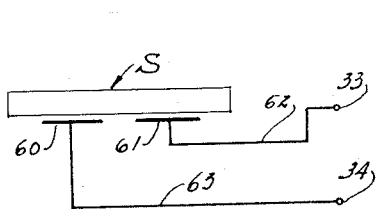
Fig. 6 shows a pair of preferred electrostatic type co-planar plate electrodes.

Figs. 6 to 9, inclusive, show various types of power absorbing electrodes typical of and suitable to the power absorption system of the present invention. Fig. 6 shows a preferred type of electrostatic field electrodes 60 and 61 of a coplanar type, such as disclosed and claimed in our copending application Serial No. 15,633, filed April 10, 1935, entitled Apparatus for electrically testing materials, etc. Electrode plates 60 and 61, which are adapted to be placed adjacent the surface of the material to be tested, have leads 62 and 63, respectively, adapted to be connected across terminals 33 and 34 of the system of Fig. 1. S indicates a piece or sample of material placed in the electrostatic field between plates 60 and 61, in position to be tested for such a quality, for instance, as moisture content. Assuming sample S to be placed in the field of plates 60 and 61, and assuming also that vacuum tube oscillator 15 is in operation, so that a high frequency oscillating current is induced in coil 30 and produces a high frequency electrostatic field in the space between said plates, and therefore through sample S, it will be appreciated, from what has previously been said, that sample S will absorb power from the electrostatic field, and that this power absorption, or dielectric loss, will vary with the moisture content of the sample. Since the vacuum tube oscillator generator sustaining the electrostatic field from which this power absorption is taking place is designed to have a high degree of voltage sensitivity to load, the voltage of the oscillator decreases in accordance with the power absorbed by sample S.

This decrease or variation in voltage is measurable across inductance 30, which is connected into the input or grid circuit 41 of vacuum tube voltmeter 16, the variation in oscillator voltage being indicated by plate circuit milliammeter 52 of the vacuum tube voltmeter.

It will be evident that with no material in the field between plates 60 and 61 other than air, the power absorption is at a minimum, and that the voltage across inductance 30 is therefore at a maximum at such time. This means that the indicating hand 52a of meter 52 will give a maximum reading under such conditions. This point is marked on the scale 64 of the meter, as indicated at $a$ in Fig. 1a. Assuming again that a material such as wood is to be tested for moisture content, a bone dry sample of such material is then placed between electrodes 60 and 61. The wood structure, resins and extractives of the dry sample then absorb a certain degree of power from the field, causing a decrease in voltage across inductance 30, and therefore a decrease in the reading of voltmeter indicator hand 52a. This point on the scale is also marked, as indicated at $d$ in Fig. 1a, and represents zero percent moisture for the material in question. When a sample of the same material containing moisture is then placed between the plates, the moisture present absorbs additional power, causing a further decrease in oscillator voltage and therefore a further decrease in the reading of indicator hand 52a. Increase in power absorption (increased moisture) is thus reflected by a decreased current flow in the plate circuit of the vacuum tube voltmeter, and therefore a lesser reading of meter hand 52a. Scale 64 is calibrated in accordance with these relations, and may read, if desired, directly in percentage of moisture present in the wood sample.

Certain types of vacuum voltmeters, e. g., those provided with a grid leak and by-pass condenser, are characterized by a plate current which varies inversely with input voltage. It will be evident that this type of voltmeter may be utilized in the system, if desired, the reading of the current indicating meter then increasing with decrease in oscillator voltage, and therefore increasing wtih increased moisture content.

Figure 7:
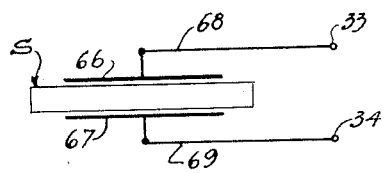
Fig. 7 shows a pair of electrodes of the simple condenser or electrostatic field type.

Fig. 7 shows a pair of electrostatic electrodes 66 and 67 of the conventional spaced parallel plate type, such as may be used in certain instances in places of the preferred electrodes of Fig. 6. Electrode plates 66 and 67 have connections 68 and 69 adapted to be connected across terminals 33 and 34 of Fig. 1.

Fig. 8 shows an inductive type of test electrode consisting of a flat coil 70, to which are connected leads 71 and 72 adapted to be connected to the output terminals 33 and 34 of such a system as shown for instance in Fig. 1. In this instance, the material to be tested is placed in the inductive or electromagnetic field of coil 70; for instance, coil 70 may be laid flat against the material, or placed closely adjacent to its surface. The material to be tested absorbs power from the high frequency electromagnetic field of coil 70, causing a decrease in oscillator voltage, which is measured in the identical manner described above. The only difference in operation is that in this instance, power is absorbed from an electromagnetic field, whereas with the condenser electrodes of Fig. 6, power is absorbed from an electrostatic field. Of course, at high frequencies, a coil may have a substantial distributed capacity and may exhibit the properties of a condenser. The coil type electrode of Fig. 8 may thus supply dielectric energy for absorption by the material on test.

Fig. 9 shows a pair of spaced electrodes 74 and 75 adapted to be placed in electrically conductive relation with the material sample S, said electrodes having connected thereto leads 76 and 77, respectively, adapted to be connected across output terminals 33 and 34 of such a system as Fig. 1. In this instance, power is absorbed from the system by virtue of the electrical resistance of the material. Otherwise, the system operates as before described.

Fig. 2 shows an oscillator of the same type as shown in Fig. 1, but to which has been applied a vacuum tube voltmeter employing a diode tube. For convenience, corresponding parts of the circuits of Figs. 1 and 2 are identified by corresponding reference numerals. Since the oscillator of Fig. 2 is exactly the same as that of Fig. 1, as will be apparent upon inspection of the figures, it will be unnecessary here to give a complete description of the oscillator of Fig. 2, and we will proceed at once to a description of the vacuum tube voltmeter applied to the oscillator of Fig. 2.

The vacuum tube voltmeter diode of Fig. 2 is indicated at 80, and the plate or anode 81 of said tube is connected by lead 83 to the grid end of the grid circuit inductance 19 of the oscillator. The filament or cathode 84 of tube 80, which is energized by current source 85, is connected by lead 46 with filament lead 44 of the oscillator. Anode circuit 83 includes current indicating meter 87, which may be a milliammeter, and a limiting resistor 88, meter 87 and resistor 88 being shunted by a by-pass condenser 89.

It will be evident that the vacuum tube voltmeter circuit is connected across oscillator inductance 19, and measures the voltage of the oscillator, the current flowing in circuit 83 being a measure of the voltage across inductance 19, and therefore of the voltage of the oscillator. The oscillator being again designed to have high voltage-sensitivity to load, meter 87 again indicates in accordance with the decrease in oscillator voltage accompanying power absorption of a material arranged to absorb power from the output circuit of the oscillator.

Fig. 3 shows a further modification of the oscillator and voltage measuring system, and represents the fundamental circuit of the present preferred form of the invention. In this instance, the oscillator and voltage measuring function of the systems previously described are combined and served by a single vacuum tube. The single vacuum tube used in this instance is indicated at 90, its grid circuit being made up of lead 91, inductance 92, lead 93 going to the adjustable tap of a grid bias battery 94, lead 95 connected to a center tap of battery 94 and going to one terminal of a switch 96, the other terminal of which is connected by wire 97 to one terminal of a switch 98, the other terminal of which is connected by wire 99 to filament lead 100. Battery 94 and switches 96 and 98 are shunted by a by-pass condenser 102. The plate of vacuum tube 90 connected to a circuit lead 105 going to one end of plate circuit inductance 106, the other end of which has connected thereto a lead 107 going to the adjustable tap of a plate voltage current source 108. To the negative terminal of source 108 is connected a lead 109, which connects to the grid filament circuit between switches 96 and 98. This lead 109 includes a switch 110. A by-pass condenser 111 is connected between lead 107 and filament lead 100, as indicated. The filament circuit is shown as provided with a variable source of current 112. Inductively coupled to oscillator inductances 92 and 96 is an inductance 115, the ends of which are connected across output electrode terminals 33 and 34, across which are adapted to be connected the test electrodes, in the manner previously described in connection with Figs. 1 and 2.

The current indicating meter, here designated at 116, and which may again be a milliammeter, may be placed in any one of three places in the system. As here illustrated, it is placed across switch 110, which is of course opened to permit the meter to function. Alternatively, meter 116 may be placed across either switch 96 or 98, the switch across which the meter is placed being in each instance opened while the other two meter switches are closed. Of course, excepting for laboratory apparatus, wherein the three connection possibilities might be desirable, switches 96, 98 and 110 will usually be omitted in practice, the indicating meter simply being connected in the circuit in series in place of any one of such switches.

The vacuum tube oscillator of Fig. 3 is again designed to have a high degree of voltage-sensitivity to load, which may be accomplished in any suitable manner, as by adjusting the sources of power upon which the oscillator depends to values below those required to sustain oscillation at a constant voltage with increasing loads. Increasing load applied across the output of the oscillator accordingly again produces a decrease in oscillator voltage.

Meter 116 is connected in series in the grid circuit when placed across open switch 96, is connected in series in the plate circuit when connected across open switch 110, and is connected in series in the filament circuit common to both grid and plate when connected across open switch 98. With the meter connected in either of these three positions, vacuum tube 90, meter 116 and voltage and power sources 108 and 94 may together be regarded as forming a vacuum tube voltmeter connected across the oscillating circuit formed by these same elements plus inductances 92 and 106 and by-pass condensers 102 and 111. In other words, the electrical current flowing through the meter in either of these three positions bears a relation to the output voltage of the oscillator, decreasing with fall of oscillator voltage. If meter 116 is connected in the grid circuit (across switch 96), then the system becomes equivalent to the circuit of Fig. 2, with the filament and grid of tube 90 of Fig. 3 corresponding to the cathode and anode of a diode high frequency rectifier and connected to meter 116 in a manner to form a diode vacuum tube voltmeter across the oscillating circuit.

With meter 116 connected across switch 110 in the plate circuit of tube 90, the circuit of Fig. 3 may be regarded as the single tube equivalent of Fig. 2, with vacuum tube 90 performing both the functions of oscillator and voltage indicating means.

With this understanding, the operation of the system of Fig. 3 will be apparent. Power absorbed from the oscillator circuit by materials on test between or associated with the test electrodes connected across terminals 33 and 34 results in a decrease in the transfer of energy from the plate to the grid circuit of the oscillator, and a corresponding decrease in the voltage of the oscillator, which is measured by a corresponding decrease in the current flowing in meter 116 in any one of the three positions described. There is an advantage presented in the system of Fig. 3 in that three alternative connection points for the indicating meter are provided. Each of the three positions will give a different characteristic response curve on any given material with any given apparatus and indicating means, as will be understood by those familiar with the art. This affords a ready method of adapting the circuit response curve to a particular material or measurement problem.

As one typical example of an arrangement of circuit constants in accordance with Fig. 3 which will produce an oscillator having the characteristics described above, the following has been found suitable. Vacuum tube 90 of Fig. 3 may be of the kind commonly designated as type 49 where the two grids are connected together to serve as one grid. Inductances 92 and 106 may be disk type spider web wound coils which cause the oscillator to resonate at a frequency of about 15 megacycles. When the filament voltage as applied by battery 112 is at a value of 1½ volts, oscillation will take place with a plate voltage of about 10 volts or higher as developed by plate battery 108 if a fixed positive bias of about 1 to 1½ volts is applied to the grid from battery 94. However, it is possible to balance plate voltage against grid bias voltage in such a manner as to obtain satisfactory operating conditions with other values of voltages. For example, with the arrangement of apparatus mentioned above operation may be secured at zero bias if the plate voltage is raised to about 40 volts. And with other types of vacuum tube, operation may be obtained at low plate voltage even with negative bias. Thus, the characteristics of the vacuum tube, as well as the characteristics of the external circuits, are factors in the determination of the voltages to be used, and it is possible that some vacuum tubes will give satisfactory operation with plate and grid voltages which would not be suitable to use with other vacuum tubes. For example, certain vacuum tubes will operate at very low plate voltages at negative bias whereas with others it is necessary to resort to positive bias before oscillation will start at the same plate voltage.

Figure 4:
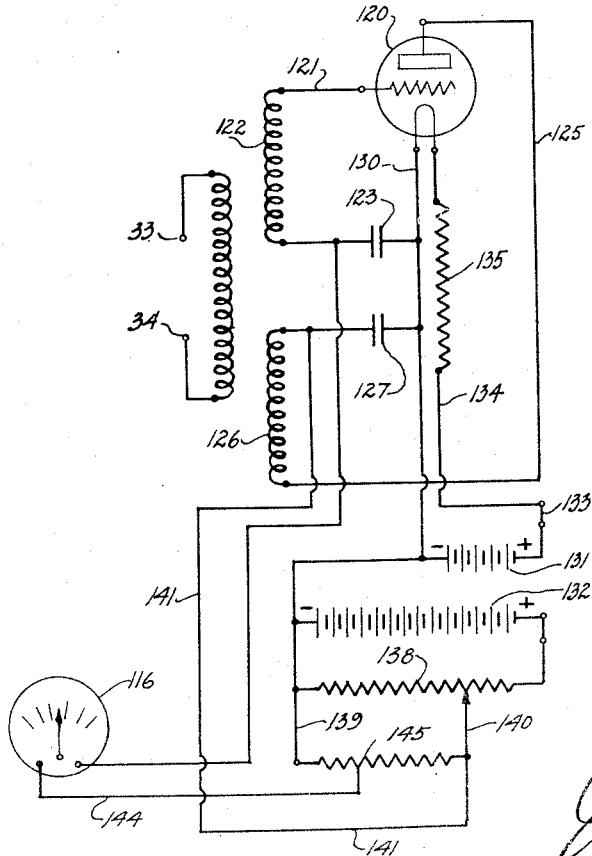
Fig. 4 shows a system of the type of Fig. 3; and showing also a single adjustment means for compensating such variable factors of the system as vacuum tube aging, decrease of battery voltage, etc.

Fig. 4 shows a circuit arrangement of the general type of that of Fig. 3, provided with adjustment means adapted for compensation of such variable factors as the effect of tube aging, variation of battery voltage with use, etc. The single vacuum tube is here indicated at 120, its grid-filament circuit 121 including inductance 122 and condenser 123. The plate filament circuit 125 includes inductance 126 coupled to inductance 122 and condenser 127. Negative filament lead 130, to which grid and plate circuits 121 and 125 are connected, has connected thereto the negative side of filament battery 131, and also the negative side of a source of current 132 serving both for plate voltage and grid bias voltage. The positive side of filament battery 131 is connected through switch 133 and lead 134, which includes resistor 135, back to the filament of tube 120.

Connected across current source 132 is a voltage divider comprising a shunt resistance 138, the moving or adjustable arm of the voltage divider being indicated at 140. Arm 140 is connected by lead 141 to the plate-filament circuit between inductance 126 and condenser 127, and supplies the plate of tube 120 with a potential of positive polarity, and of a voltage depending upon the adjustment of arm 140 along voltage divider resistance 138.

The grid of tube 120 is potentiated by a lead 144 connected to a selected tap between the ends of a resistance 145 connected in shunt with the negative end of resistance 138 and adjustable voltage divider arm 140, said lead being connected to the grid circuit between condenser 123 and inductance 122, and providing the grid with a fixed positive bias. It will be evident that the grid bias potential will depend first upon the location of the point of connection of lead 144 with resistance 145, and second upon the adjustment of arm 140 along resistance 138. The current indicating meter 116 is connected in series with lead 144, so as to read the average direct current component of grid current, which varies in consonance with oscillator output voltage, and hence in consonance with the power absorbed from the oscillator.

Adjustment of voltage divider arm 140 along resistance 138 serves as a single means for maintaining the various variable factors of the system in adjustment. Once meter 116 has been calibrated, the "air" and "bone dry" readings of the meter will vary from time to time, caused by tube and battery aging, etc. These factors are compensated for by the single control consisting in adjusting the position of voltage divider arm 140 along resistance 138, which serves to vary proportionately the plate and grid bias voltages, it being evident that in all positions of adjustment of arm 140, the bias voltage applied to the grid circuit is a definite and fixed fraction of the voltage applied to the plate circuit. As stated, this single adjustment serves in practice to compensate the various variable factors of the system, so that by virtue of this adjustment the indicating hand of meter 116 may quickly be brought back to its previously described zero point positions $a$ and $d$ whenever any variation has taken place, after which the hand of meter 116 will again read accurately over its calibrated scale.

Figure 5:
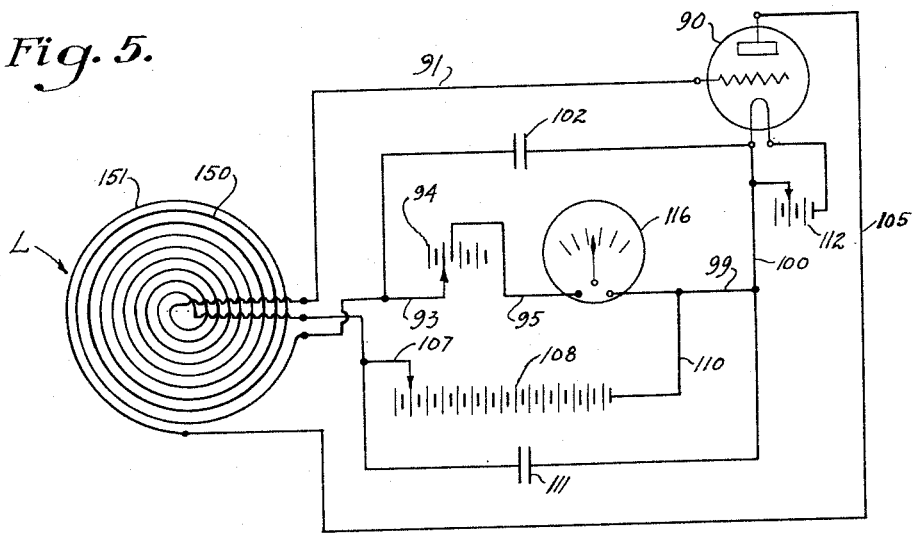
Fig. 5 is another modification of the general type of Fig. 3, but in which the oscillator circuit itself is formed and adapted to serve as a test electrode.

Fig. 5 shows another modification of the invention, in which the inductances of the oscillator are arranged to serve as the power absorbing electrodes. The system shown in Fig. 5 is again of the single tube type based on the fundamental circuit of Fig. 3, and for convenience corresponding elements of the systems of Figs. 3 and 5 are identified by like reference numerals. In the system of the Fig. 5, however, the grid-filament circuit inductance, identified by numeral 150, and the plate-filament inductance, identified by numeral 151, are wound together as a flat spiral, in the manner indicated in Fig. 5. The oscillator is again designed to have a high degree of voltage-sensitivity to load, as in the previously described forms of the invention. In this instance, the flat, spiral inductive electrode L made up of the coupled grid and plate circuit inductances of the oscillator is adapted to be placed in power absorbing relation to the material to be tested, as by being placed closely adjacent the surface of the material. The operation of the system in this form will be evident, the electrode L supplying power to the material under test, and the voltage of the oscillator decreasing accordingly and being measured by a meter 116 connected in either of leads 95, 99 or 110. As here shown, the meter is placed in grid circuit lead 95. It will of course be understood that the coils 150 and 151 may have a certain distributed capacity, and will therefore have a dielectric field, as well as an inductive field, from which power may be absorbed.

The system of Fig. 5 is advantageous in that the separate output circuits and electrodes of the forms previously described are eliminated, the inductances of the oscillator itself being arranged for direct power absorption from the material to be tested. This system of Fig. 5 is illustrative of any type of circuit in which a member or members of the primary oscillation circuit serves also as the power absorption means, it being understood that it is not essential, even though advantageous, that both grid and plate circuit inductances be placed in power absorbing relation to the material. Thus it is to be understood that where we refer generically to the output circuit of the oscillator, that expression denotes whatever part of the oscillating system serves to supply power for quantitive absorption by the material under test.

While in the illustrative oscillator systems described in the foregoing the plate and grid circuits are inductively coupled in each instance, it will be understood that this is not essential or limitative in any way, since capacitatively coupled circuits, or circuits electronically coupled within the tube, in ways which are now conventional, may be substituted without departing from the scope of the invention. And further in this connection, it will be evident that the illustrative circuit of Fig. 5, which is characterized by the fact that it is an element of primary oscillation circuit of the tube that is utilized to absorb power from the material on test, may be modified by associating the material on test in capacitative relation to any condenser element of the primary oscillation circuit, all within the scope of the instant invention.

The system of the present invention is intended and adapted for signal and control applications as well as measurement applications. For instance, Fig. 10, which is again based on the fundamental system of Fig. 3, is arranged to operate a signal in accordance with power absorbing characteristics of a material under test. Since the oscillator of Fig. 10 is the same as that indicated in Fig. 3, a detailed description will not be required, and for convenience, corresponding elements are designated by like numerals, it being understood that the oscillator of Fig. 10 is again designed to have high voltage-sensitivity to load.

As typical of a situation to which the system of Fig. 10 may be applied, there is shown a travelling web W, which may be considered to be a web of paper. The system may be designed to operate a signal either when the moisture of the paper exceeds a given limit, or when it falls below a given limit. As a typical example, we here illustrate the system as arranged to operate a signal when the moisture or any other given power absorbing substance, in the web exceeds a given or desired limit. Positioned adjacent the travelling web W are a pair of electrostatic type electrodes 160 and 161, here indicated as of the preferred co-planar type, said electrodes being connected across inductance 115 coupled to the oscillator. In this illustration grid circuit lead 95 is chosen for incorporation in the relay control circuit, though such circuit may of course be connected in series in either of leads 97 or 109. Thus lead 95 goes to current indicating meter 116, the other side of which is connected by way of lead 164 to the winding 165 of a relay 166, the other side of said winding having connected thereto a lead 167 connecting to plate circuit lead 109 and filament lead 97. Relay 166 normally closes a pair of contacts 169, but when energized with a current of predetermined magnitude, operates to open said contacts. Contacts 169 are included in a signal circuit 170 including battery 171 and signal or alarm 172.

The system is so designed that with proper or desired dryness in paper web W, the power absorbed from the oscillator is relatively low, the output voltage of the oscillator accordingly is near its maximum value (or at least substantially above its minimum value), and the electrical current flowing in circuit 95, 164, 167 is correspondingly high and energizes relay winding 165 sufficiently to raise the relay armature and open contacts 169. The signal circuit is accordingly open at such time. If the moisture of web W should now exceed a predetermined value, power absorption from the oscillator increases, the oscillator voltage decreases, and the resulting decrease of electrical current in circuit 95, 167 reduces the energization of relay winding 165 sufficiently to permit the relay armature to drop and close contacts 169, thus closing the signal circuit and causing signal 172 to operate. It will of course be obvious that while relay 166 has been typically illustrated as holding contacts 169 open with normal current flow in "measuring" or "relay control" circuit 95, 167, the relay may equally as well be so arranged as to hold signal circuit control contacts 169 closed, and to open said contacts upon decrease of current in control circuit 95, 167, in which event the system would produce a signal upon decrease of moisture in web W below a predetermined value rather than upon increase of moisture above a predetermined value.

Fig. 11 illustrates diagrammatically in accordance with the present invention of the system as shown in Fig. 10 to control of such a process as controlled drying of a travelling web. Numeral 184 indicates a travelling web, for instance a web of paper, entering a diagrammatically illustrated drier 185, the web emerging from the drier passing in power-absorbing relation to a pair of power absorbing electrodes 186 and 187 here typically indicated as of the co-planar electrostatic field type. Electrodes 186 and 187 are connected by leads 31 and 32 to the input terminals 33 and 34 of the control system, diagrammatically indicated at 188. This control system may typically be considered as having therein the same electric circuiting as illustrated in Fig. 10, the output leads 167 and 164 being understood to be connected into the circuit in the same manner as in Fig. 10. The oscillator of the unit of Fig. 11 is thus again of a type having a high degree of voltage sensitivity to load, and circuit 164, 167 will be understood to be in a lead of said oscillator in which flows a current which varies with the output voltage of the oscillator. Said output leads 164 and 167 are connected into the input side of a potentiometer relay controller 190, which may for instance be of any type well known to those skilled in the art. This potentiometer relay controller is designed to control the leads 191, 192, 193 and 194 leading to a reversible electric motor 195, in such manner as to cause said motor to drive in one direction when the current flow exceeds a predetermined value, and to drive in the opposite direction when said current flow falls below said value. Since a potentiometer relay controller adapted for such purpose, and the method of connecting it with a reversible electric motor to perform the functions described, are well known to those skilled in the art, and per se form no part of the instant invention, no further description of that part of the system is deemed essential. Motor 195 is geared at 197 to the rotatable shaft or stem 198 of a steam valve 199 in the steam line 200 going to drier 185, such steam being understood to be utilized within the drier to heat the usual rolls over which the paper web is trained.

Operation of the system of Fig. 11 is as follows: With proper moisture content (or proper degree of dryness) in the paper web emerging from the drier, a degree of power is absorbed from the oscillator system such as to cause an oscillator voltage drop sufficient to establish the current flow in circuit 164, 167 at a certain predetermined level.

The potentiometer relay controller is so adjusted, by well known methods, as to hold motor 195 stationary when a current of such value flows in circuit 164, 167. When the moisture of the emerging web exceeds the desired percentage, additional power is absorbed by the oscillator, effecting a decrease of oscillator voltage, and an accompanying decrease of current flow in circuit 164, 167, and this decreased current flow operates potentiometer relay controller 190 to energize motor 195 to drive in such a direction as to widen the opening through steam valve 199, thereby increasing the heat within drier 185 and reducing the moisture content in the emerging web. The potentiometer is so designed, by methods of conventional practice, that the motor drives a short distance, depending upon the correction required (as reflected by the decreased current flow input to the potentiometer controller by way of circuit 164, 167), and is then stopped. If the web is then dried to too great an extent, power absorption decreases, and the current flow in circuit 164, 167 increases, and causes the potentiometer controller to energize valve control motor 195 to drive a certain distance in the reverse direction to decrease the heat of the drier, again depending upon the degree of change in dryness of the web. Likewise, if initially the web is dried below the desired level, the potentiometer controller operates valve control motor to drive a limited distance in such direction as to decrease the heat of the drier. The controller will again operate the valve motor to return the heat to its original level if or when the moisture of the web subsequently increases.

Thus the system of Fig. 11 automatically controls the heat of the drier to maintain constant the percentage of moisture remaining in the web upon emergence from the drier. This illustration of the system is typical of various applications of the invention to problems of process control, and the invention is contemplated as including all such processes of which the one given is typical.

Fig. 12 illustrates the application of a power absorption method to the control of various industrial processes, typical of which is the measurement or weighing of materials. Such an application as that of Fig. 12 is illustrative of the invention as adapted to this type of use, though the weighing or measurement illustration given, while itself constituting a part of the present invention, is not to be considered as limitative on or exhaustive of the possibilities of the system as applied to control of industrial processes, but only as typical of the invention in such general form.

We have chosen to illustrate the system of Fig. 12 in connection with a circuit of the type illustrated in Fig. 5, in which the power absorbing electrode is of the inductive type, consisting of windings included in the grid and plate circuit of the oscillator. Such an electrode is indicated at L in Fig. 12, and is shown as connected by its circuit wires 91, 93, 107 and 105 to the oscillator, which is of the same type as shown in Fig. 5, corresponding elements of the systems shown in Figs. 12 and 5 being identified by the same reference numerals. Numeral 220 designates a beam fulcrumed at 221, one arm of which is adapted to have placed thereon packages 222 to be filled, for instance with some material such as a powder, cereal, etc., and the other arm of which is provided with a counterweight Wt and with a pad or disc 223 of some non-hygroscopic constant power absorbing material such as fiber, which is preferably lacquered, and which is preferably of an impedance approximately equal to that of the electrode and associated circuits used in connection therewith. Counterweight Wt is of such weight that the package carrying end of the beam stands in an uppermost position when the package is empty, but is overbalanced, allowing the package end of the beam to descend, as the package is filled. The package on the beam is adapted to be filled from a hopper 223a controlled by a gate 224, the latter being here typically or diagrammatically indicated as being operated by a lever 225 pivoted at 226 and operated by the plunger 227 of a solenoid winding 228. Winding 228 is in a circuit 230, 231 controlled as presently to be described. It will be evident that when solenoid 228 is energized, coil 227 rises, moving gate 224 downwardly to interrupt flow of material from hopper 223a into package 222. Plunger 227 stands normally in the lowermost position illustrated, with gate 224 in open or discharge position.

As package 222 is filled from hopper 223a, the counterweighted end of the arm is overbalanced and power absorbing pad 223 is raised into power absorbing relation with electrode 235, which is here typically illustrated as of the inductive type (see Fig. 5), as mentioned previously. The oscillator being again one of high voltage sensitivity to load, elevation of pad 223 into power absorbing relation with electrode 235 places an increased load on the oscillator, with resulting decrease of current flow in circuit lead 95. Connected in series with meter 118 in grid circuit lead 95 is the winding of a relay 236, the contacts 237 of which are held open by the relay when a certain predetermined current flows in its winding, but which are closed when the current flow falls below that value. These relay contacts 237, together with a battery 238, are included in the previously mentioned solenoid control circuit 230. The system is so designed that the normal current flow in circuit 95, and therefore in the winding of relay 236, when pad 223 is below electrode 235 is such as to hold relay 236 open; further, the system is so designed and balanced that when a predetermined weight of material has been discharged into package 222, power absorbing pad 223 will be lifted into power absorbing relation to electrode 235, effecting a decrease in curent in circuit 95 at such time sufficient to allow relay 236 to close contacts 237. Circuit 230 is thus closed and energizes solenoid 228 to move gate 224 to closed position, thus arresting flow of material into package 222.

Conventional means, well understood by those skilled in the art, may of course be employed for automatic removal of a filled package 222 and placement of a succeeding empty package in its place. The system thus furnishes a novel and highly sensitive means for controlling accurately the filling of containers. Attention is called to the fact that in the illustration of Fig. 12, the material itself, for example, the powder filled into package 222, is not placed in power absorbing relation to the system, but that a separate power absorbing element is employed, in this instance pad 223 mounted on the package carrying beam.

While the system of Fig. 12 has been illustrated in connection with the inductive electrode type of equipment, explained in detail in connection with Fig. 5, it will of course be understood that any other form of power absorbing electrode and associated control system may be used. For instance, power absorbing element 223 may be arranged to move into power absorbing relation with any of the type of electrodes hereinbefore described, or to any of which those described are typical or illustrative, whether of the inductive field, electrostatic field, or electrical resistance type.

Attention is called to the fact that the system of Fig. 12 is not necessarily restricted to placement of the power absorbing pad on the moving member of the apparatus, with the power absorbing electrode or electrodes stationary, since by simple reversal the beam or other moving member may carry the power radiating electrodes, while the power absorbing pad may be stationary, the electrical parts of the system being unaffected. Such an adaptation is particularly useful in other applications of the invention (aside from weighing) in which the entire control unit including the oscillator, may be arranged to travel with reference to the power absorbing pad.

Among the advantages of the system of Fig. 12 may be mentioned, first, that considerable power is available even with relatively small mechanical movements; the apparatus is extremely simple as compared to existing photoelectric and capacity systems; and particularly as applied to weighing, the system is or may be mounted separately of the moving member or beam, leaving the apparatus free to operate as a scale beam. Apart from the specific weighing illustration given, the general type of system disclosed in Fig. 12, which may be regarded as characterized by the provision of a power absorbing body movable into and out of, or toward and from, power absorbing relation with the power delivering means of the oscillator, has a wide field of application and usefulness in any situation in which it may be desired to produce a current response in accordance with a movement of a body, or the position of a movable body, whether for purposes of indication or control, the point of indication or control being capable of location either close at hand to the power loss body, or at any remotely located indication or control point. The system has the advantage that mechanical connection between the moving power absorbing body, or any apparatus on which the latter may be mounted, and the control equipment is entirely avoided, thus leaving said body, or body and apparatus on which the body may be mounted, free for unimpeded movement or operation, and having the further advantage that sensitive control of apparatus in accordance with movement of the power absorbing body may be achieved without impairing the functions of said apparatus through the attachment of mechanical devices.

Various illustrative forms and applications of the invention have now been disclosed, though it is to be understood that those given are merely illustrative of rather than restrictive on the broader aspects of the invention. The invention has in large part been disclosed by way of registration of moisture, or of control in accordance with degree of moisture content. It is to be understood, however, that moisture is but one example of a substance to which the system is responsive, and that the system may be standardized to measure or control in accordance with any material having power absorbing characteristics, either with reference to an electrostatic or electromagnetic field, or with reference to a flow of electrical current. The system is further available for and applicable to measurement of electrical properties of materials such as dielectric losses or electrical resistance, and the indicating meter of the system may be directly calibrated in terms of such properties. Further, since a loss of power from an alternating current system is accompanied by a shift of power factor, the measurement of such loss may be taken to indicate power factor, and the system may therefore be utilized to measure power factor. The system is also useful to measure physical dimensions of materials. For example, since the total power losses in a sheet will vary with the thickness of the sheet, a measurement of such power losses may be taken as a measurement of sheet thickness, and an indicating meter may be calibrated in such terms. As stated above, the invention is also intended and adapted for incorporation in various types of relay control applications, including signaling, counting, sorting, weighing, measuring or regulation control, of processes of various sorts, etc. While for illustrative purposes a vacuum tube of the simple triode type has been shown in the oscillator, it will be understood that tubes of other types, including tubes of the beam variety, may also be used. The invention is therefore to be considered as not limited in scope to the several typical forms and applications here given, but only as may fairly be construed from the appended claims.

We claim:

1. The method of measuring a function of the power absorption in a sample of material, which comprises producing an oscillating current of voltage which decreases substantially with load, placing the material in a given power absorbing relation to said oscillating current, and evaluating the function to be measured from the resulting decrease in voltage of the oscillating current.

2. The method of measuring a function of the power absorption in a sample of material, which comprises producing an oscillating current of voltage which decreases substantially with load, placing the material in a given power absorbing relation to said oscillating current, and evaluating the function to be measured from the change in strength of an electrical current which varies with and as a result of the resulting decrease in voltage of said oscillating current.

3. The method of obtaining an electrical current which is a measure of a function of the power absorption in a sample of material, that comprises producing an oscillating current of voltage which decreases substantially with load, placing the material in power absorbing relation to said oscillating current, whereby said voltage is caused to decrease, and causing an electrical current to vary in accordance with said decrease in voltage of said oscillating current.

4. Apparatus for measuring a function of the power absorption properties of a material, comprising a vacuum tube oscillator, current supply means for said oscillator so adjusted in voltage as to impart to said oscillator a characteristic of substantial decrease in voltage across its oscillating circuit with increase in power drawn from the oscillator, said oscillator having an output circuit, means in said output circuit for associating said material in power absorbing relation to said circuit, and means for measuring the decrease in oscillator output voltage resulting from power absorption by said material.

5. Apparatus for measuring a function of the power absorption properties of a material, comprising a vacuum tube oscillator, current supply means for said oscillator so adjusted in voltage as to impart to said oscillator a characteristic of substantial decrease in voltage across its oscillating circuit with increase in power drawn from the oscillator, said oscillator having an output circuit, and having a measurement circuit in which flows an electrical current that varies with the output voltage of the oscillator, means in said output circuit for associating said material in power absorbing relation to said circuit, and a current meter in said measurement circuit.

6. In control apparatus, a vacuum tube oscillator, current supply means for said oscillator so adjusted in voltage as to impart to said oscillator a characteristic of substantial decrease in voltage across its oscillating circuit with increase in power drawn from the oscillator, said oscillator having an output circuit, and having a relay control circuit in which flows a current dependent upon the output voltage of the oscillator, means in said output circuit for associating a power absorbing member in power absorbing relation to said circuit, and a control relay system energized by current flowing in said relay control circuit.

7. In control apparatus, a vacuum tube oscillator, current supply means for said oscillator so adjusted in voltage as to impart to said oscillator a characteristic of substantial decrease in voltage across its oscillating circuit with increase in power drawn from the oscillator, said oscillator having an output circuit, and having a relay control circuit in which flows a current dependent upon the output voltage of the oscillator, means in said output circuit for associating a power absorbing member in power absorbing relation to said circuit, a control relay energized by current flowing in said relay control circuit, and an electric circuit controlled by said relay, said relay being adapted to control said last mentioned circuit when a given current flows in said relay control circuit.

8. Apparatus for measuring a function of the power absorption properties of a material, comprising a vacuum tube oscillator of high voltage sensitivity to load, said oscillator including coupled grid-filament circuit and plate-filament circuit coils, an output circuit coupled to said circuits, means for associating said material in power absorbing relation to said output circuit, and a vacuum tube voltmeter for measuring the variable voltage drop across one of said circuits.

9. Apparatus for measuring a function of the power absorption properties of a material, comprising a vacuum tube oscillator, current supply means for said oscillator so adjusted in voltage as to impart to said oscillator a characteristic of substantial decrease in voltage across its oscillating circuit with increase in power drawn from the oscillator, said oscillator including coupled grid-filament circuit and plate-filament circuit coils, and a current indicating meter in series with one of said coils.

10. Apparatus for measuring a function of the power absorption properties of a material, comprising a vacuum tube oscillator, current supply means for said oscillator so adjusted in voltage as to impart to said oscillator a characteristic of substantial decrease in voltage across its oscillating circuit with increase in power drawn from the oscillator, said oscillator including a vacuum tube having a grid-filament circuit, a coil and a grid biasing source of voltage in said grid-filament circuit, a by-pass condenser shunting said grid biasing source of voltage, a plate-filament circuit for the vacuum tube, a coil coupled with the first mentioned coil, a plate voltage source of current in said plate-filament circuit, a by-pass condenser shunting said plate voltage current source, a current indicating meter in series with one of said sources of current, and means for associating said material in power absorbing relation to said oscillator.

11. Apparatus of the character described, comprising a vacuum tube oscillator of high voltage sensitivity to load, said oscillator being adapted to have power absorbed therefrom by a power absorbing material, coupled grid-filament and plate-filament circuits, electric power source means for supplying plate and grid circuit currents, and means for proportionately regulating the voltages applied to said circuits.

12. Apparatus of the character described, comprising a vacuum tube oscillator of high voltage sensitivity to load, said oscillator being adapted to have power absorbed therefrom by a power absorbing material, a source of potential, a voltage divider resistance shunting said source of potential, the negative side of said source of potential being connected to the filament of the vacuum tube, an adjustable arm movable along said resistance, a lead connecting said arm into the plate-filament to potentiate the plate element of the oscillator, a resistance shunted across said movable arm and the negative terminal of said source of current, and a tap intermediate the ends of said last mentioned resistance connected into the grid-filament circuit to bias the grid with positive charge.

13. In apparatus of the character described, the combination of an oscillator, current supply means for said oscillator so adjusted in voltage as to impart to said oscillator a characteristic of substantial decrease in voltage across its oscillating circuit with increase in power drawn from the oscillator, said oscillator being adapted to have a material of power absorbing characteristics placed in power absorbing relation thereto, a lead in said oscillator carrying an electric current that varies with oscillator voltage, and an instrumentality in circuit with said lead responsive to current variations therein.

14. In apparatus of the character described, a vacuum tube oscillator, current supply means for said oscillator so adjusted in voltage as to impart to said oscillator a characteristic of substantial decrease in voltage across its oscillating circuit with increase in power drawn from the oscillator, said oscillator comprising coupled grid and plate circuit coils adapted to be placed in power absorbing relation to a material of power absorbing characteristics, a lead in said oscillator carrying an electric current that varies with oscillator voltage, and an instrumentality in circuit with said lead responsive to current variations therein.

15. In apparatus of the character described, a vacuum tube oscillator of high voltage sensitivity to load, said oscillator comprising coupled grid and plate circuit coils adapted to be placed in power absorbing relation to a material of power absorbing characteristics, said coils being wound in a flat spiral, a lead in said oscillator carrying an electric current that varies with oscillator voltage, and an instrumentality in circuit with said lead responsive to current variations therein.

16. In control apparatus, a vacuum tube oscillator, current supply means for said oscillator so adjusted in voltage as to impart to said oscillator a characteristic of substantial decrease in voltage across its oscillating circuit with increase in power drawn from the oscillator, said oscillator having a relay control circuit in which flows a current dependent upon the output voltage of the oscillator, a power absorbing member adapted to draw electric power from said oscillator, means for moving said power absorbing member into power absorbing relation to said oscillator, and a relay system controlled by current flowing in said relay control circuit.

17. In control apparatus, a vacuum tube oscillator of high voltage sensitivity to load, and having a relay control circuit in which flows a current dependent upon the output voltage of the oscillator, a power absorbing member adapted to draw electric power from said oscillator, means for moving said power absorbing member into power absorbing relation to said oscillator, a control relay controlled by current flowing in said relay control circuit, and means controlled by said relay system for performing an operation timed with motion of the moving means for the power absorbing member.

18. In a weighing system, an oscillator system, a power output circuit associated in said oscillator system, said oscillator system including a control circuit in which flows an electric current that varies with changing power absorption from the oscillator system, a moving balance, a power absorbing member moving with said balance into power absorbing relation to said oscillator output circuit when said balance is moved to a given position by a given load applied thereto, means for discharging material to be weighed onto said balance, and means for interrupting discharge of material onto said balance when said balance has moved under the increasing load of the material into said given position, said means operating by virtue of change of current in said control circuit caused by increased power absorption from the oscillator accompanying movement of the power absorbing member into power absorbing relation to said power output circuit.

19. In a weighing system, an oscillator having high voltage sensitivity to load, a power output circuit associated in said oscillator, said oscillator having a control circuit in which flows an electrical current that varies with oscillator output voltage, a moving balance, a power absorbing member moving with said balance into power absorbing relation to said oscillator output circuit when said balance is moved to a given position by a given load applied thereto, means for discharging material to be weighed onto said balance, and means for interrupting discharge of material onto said balance when said balance has moved under the increasing load of the material into said given position, said means operating by virtue of decrease in current in said control circuit caused by increased power absorption from the oscillator accompanying movement of the power absorbing member into power absorbing relation to said power output circuit.

20. Apparatus for measuring a function of the power absorption properties of a material, comprising a vacuum tube oscillator, current supply means for said oscillator adjusted to underpotentiate said oscillator whereby said oscillator has a rapidly falling voltage output with increasing power drawn therefrom, means for associating the material in power absorbing relation to the oscillator, and indicating means for measuring an electric current that varies with the output voltage of the oscillator.

21. Apparatus for measuring a function of the power absorption properties of a material, comprising a vacuum tube oscillator, current supply means for said oscillator adjusted to underpotentiate said oscillator whereby a current flowing in a circuit of said oscillator decreases materially with small increases in power drawn from said oscillator, a meter for reading said current, and means for associating the material in power absorbing relation to the oscillator.

22. In a system responsive to power absorption by a material, the combination of a vacuum tube oscillator having plate and grid circuits, said oscillator being adapted and arranged to supply power for absorption by said material, sub-voltage electric power supply means for said oscillator, so adjusted in voltage that the oscillating output voltage of the oscillator and the direct current component of plate current substantially fall in accordance with increase in power absorbed from the oscillator by said material, and means associated with the plate circuit responsive to change in strength of the direct current component of plate current.

23. In a system responsive to the power absorption by a material, the combination of a vacuum tube oscillator having plate and grid circuits, and adapted and arranged to supply power for absorption by said material, electric power supply means for said oscillator adjusted to sufficiently low voltage to impart to said oscillator a characteristic of high voltage sensitivity to load, whereby grid current falls materially with increasing load, and means responsive to change in strength of average current flow in said grid circuit.

24. In a system for measuring a function of the power absorption properties of a material, the combination of a vacuum tube oscillator adapted to supply power to said material, said oscillator including plate and grid circuits and a source of plate current of sufficiently low voltage to impart to the oscillator a characteristic of substantially falling plate current with increasing power drawn therefrom, and means for measuring the direct current component of plate current.

25. In a system for measuring a function of the power absorption properties of a material, the combination of a vacuum tube oscillator adapted to supply power to said material, said oscillator including plate and grid circuits and a source of plate current of sufficiently low voltage to impart to the oscillator a characteristic of substantially falling output voltage and substantially falling grid current with increasing power drawn therefrom, and current measuring means responsive to change in grid current.

26. In a system responsive to the power absorption by a material, the combination of a vacuum tube oscillator adapted to supply power to said material, said oscillator including a cathode circuit and plate and grid circuits, means for supplying the grid with a fixed positive bias, and sources of cathode and plate current of sufficiently low voltage to impart to the oscillator a characteristic of substantially falling output voltage with increasing power drawn therefrom, whereby grid current falls materially with increasing power absorbed by the material, and means responsive to change in strength of average grid current.

27. In a metering system, the combination of an oscillator having plate and grid circuiting, and having power output means, sub-voltage power supply means for said oscillator, so adjusted that a current flow in said circuiting decreases substantially with increase in power drawn from said oscillator, a discrete power absorbing body of fixed power absorbing characteristics capable of being conditioned into and out of power absorbing relation with said power output means, and an instrumentality responsive to change in strength of said current flow.

28. In a metering system, the combination of an oscillator having plate and grid circuiting, and having power output means, sub-voltage power supply means for said oscillator, so adjusted that a current flow in said circuiting decreases substantially with increase in power drawn from said oscillator, a power absorbing body of fixed power absorbing characteristics relatively movable to said power output means to vary the distance between the two and adapted to absorb power from said output means in an amount dependent upon its proximity to said power output means, and an instrumentality responsive to change in strength of said current flow.

29. In a metering system, the combination, with a movable body of power absorbing characteristics, of an oscillator having power output means positioned to deliver power for absorption by said movable body, and from which variable power is drained by said body depending upon the nearness of approach of said body, sub-voltage current supply means for said oscillator, so adjusted in voltage that a current flow in said oscillator decreases substantially with increase in power drawn from the oscillator by said movable body, and an instrumentality responsive to said current flow.

30. In control apparatus, an oscillator of high voltage sensitivity to load, and having a circuit in which flows an electric current that varies in magnitude in consonance with the output voltage of the oscillator, said oscillator having power output means, a power absorbing body adapted to draw power from said output means, means for moving said power absorbing body toward and from power absorbing relation to said output means, and means responsive to variations in magnitude of said current for performing an operation functionally related to motion of the moving means for said power absorbing body.

31. In control apparatus, a vacuum tube oscillator having a circuit in which flows an electric current that changes in magnitude with variation in power load on said oscillator, said oscillator having power output means, a power absorbing body of fixed power absorbing characteristics adapted to draw power from said output means, means for moving said power absorbing body relatively to said output means to vary the distance between the two and thereby the power absorbed from said output means by said body, and means responsive to variations in magnitude of said current for performing an operation functionally related to motion of the moving means for said power absorbing body.

32. The method of obtaining sensitive electric current responses dependent upon a function of the power absorption properties of a material, that comprises operating a vacuum tube oscillator at sufficiently low plate voltage that it has a range of operation characterized by a substantially falling output voltage, and corresponding substantially falling direct current plate and average grid currents, with increase in power drawn therefrom, and associating said material in power absorbing relation to said oscillator, whereby the direct current plate and average grid currents of said oscillator decrease sensibly in accordance with increase in power absorption from the oscillator by said material.

33. In apparatus for producing an electrical current response dependent upon electrical power absorbed by a body of material, an oscillator having power output means from which said body may draw power when positioned in a power absorbing relation to said output means, sub-voltage current supply means for said oscillator, so adjusted in voltage that a current flow in said oscillator falls sensibly when power is drained from said oscillator by said body, and current responsive means associated with said oscillator in a manner to respond to changes in strength of said current flow.

34. In a metering system, the combination of an oscillator having power radiating means, a movable power absorbing body of predetermined power absorbing characteristics constrained to movement relatively to said power radiating means along a path which is so disposed that such movement results in varying the distance between said body and said power radiating means and thereby varying the power absorbed by said body from said power radiating means, and an instrumentality associated with said oscillator responsive to changes in power drawn from said oscillator by said power absorbing body, all arranged in such manner that the response of said instrumentality is governed by the proximity of said movable power absorbing body to said power radiating means.

ROBERT L. STEVENS.
JAMES P. DALLAS.